3 Sheets—Sheet 1.

D. W. MARMON & J. WARRINGTON,

Assignors to NORDYKE AND MARMON COMPANY.

ROLLER MILL

No. 10,493. Reissued June 24, 1884.

WITNESSES.

Chas. N. Leonard.

E. W. Bradford

INVENTORS.

Daniel W. Marmon, and Jesse Warrington,

PER

C. Bradford,

ATTORNEY.

N. PETERS. Photo-Lithographer, Washington, D. C.

D. W. MARMON & J. WARRINGTON,

Assignors to NORDYKE AND MARMON COMPANY.

ROLLER MILL.

No. 10,493. Reissued June 24, 1884.

WITNESSES.

Chas. N. Leonard,

E. W. Bradford.

INVENTORS.

Daniel W. Marmon, and Jesse Warrington,

PER

C. Bradford.

ATTORNEY.

N. PETERS, Photo-Lithographer, Washington, D. C.

D. W. MARMON & J. WARRINGTON,

Assignors to NORDYKE AND MARMON COMPANY.

ROLLER MILL.

No. 10,493. Reissued June 24, 1884.

WITNESSES.

Chas. N. Leonard.

E. W. Bradford

INVENTORS.

Daniel W. Marmon,
and Jesse Warrington,
PER
C. Bradford.
ATTORNEY.

N. PETERS, Photo-Lithographer, Washington, D. C.

UNITED STATES PATENT OFFICE.

DANIEL W. MARMON AND JESSE WARRINGTON, OF INDIANAPOLIS, INDIANA, ASSIGNORS TO NORDYKE & MARMON COMPANY, OF SAME PLACE.

ROLLER-MILL.

SPECIFICATION forming part of Reissued Letters Patent No. 10,493, dated June 24, 1884.

Original No. 265,927, dated October 10, 1882. Application for reissue filed January 26, 1883.

*To all whom it may concern:*

Be it known that we, DANIEL W. MARMON and JESSE WARRINGTON, of the city of Indianapolis, county of Marion, and State of Indiana, have invented certain new and useful Improvements in Roller-Mills, of which the following is a specification.

Our said invention consists in certain new and improved mechanism in that class of machinery for the reduction of grain known as "roller-mills," whereby the parting of the grinding-rolls and shutting of the feed-gates, or the bringing of said rolls in grinding relation and opening of said feed-gates, can be operated simultaneously; and, further, in mechanism so constructed that while the feed-gates may be operated simultaneously with the grinding-rolls, they may also be operated independently of said rolls when desired, as will be hereinafter more particularly described and claimed.

Figure 1:
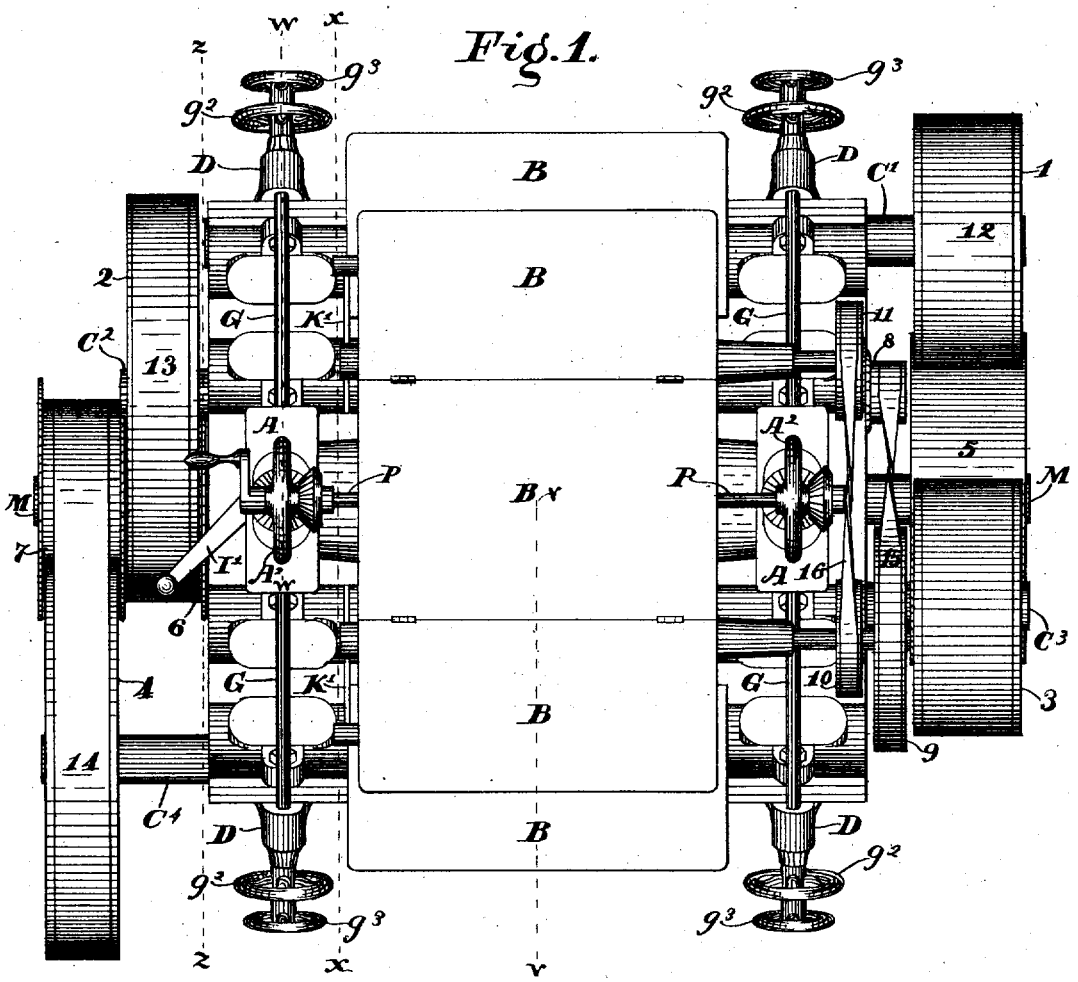
Figure 2:
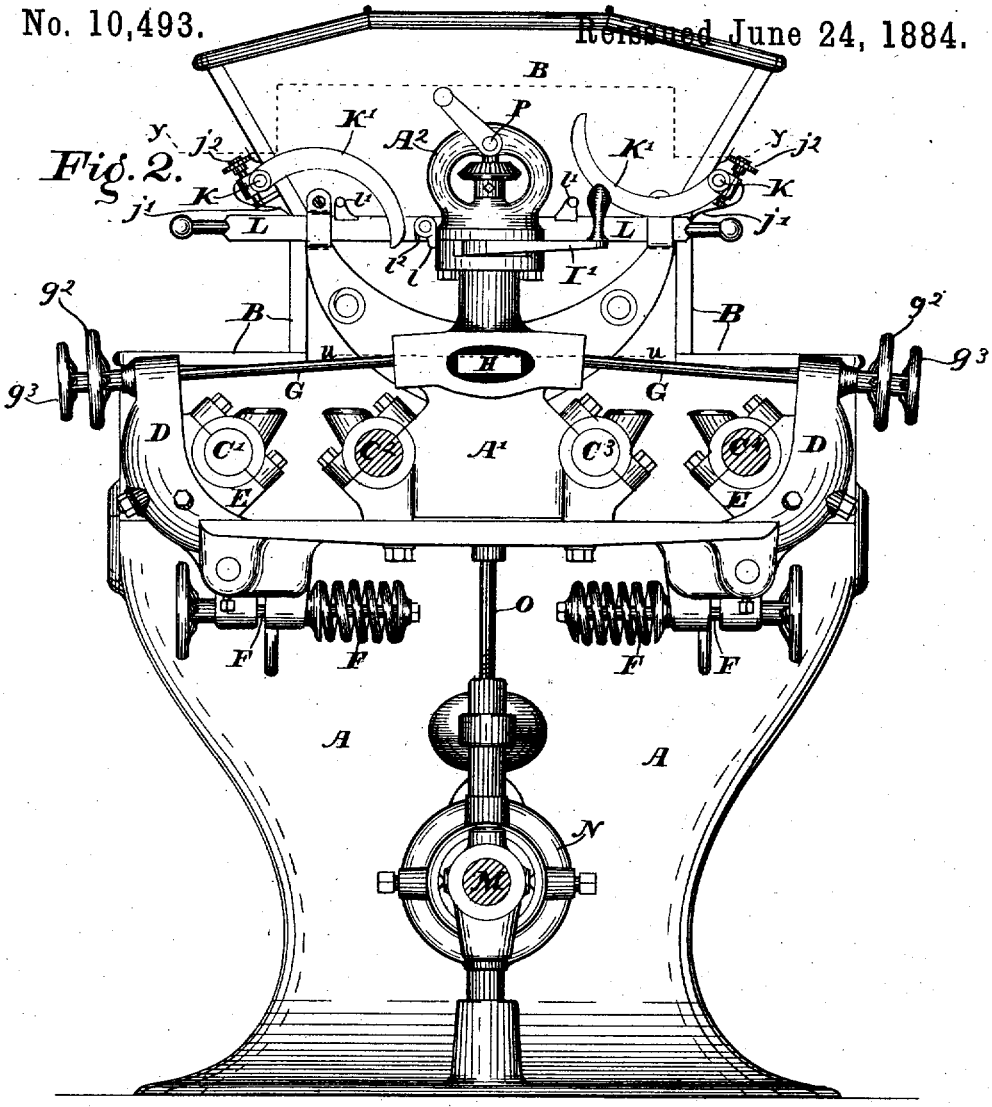
Figure 3:
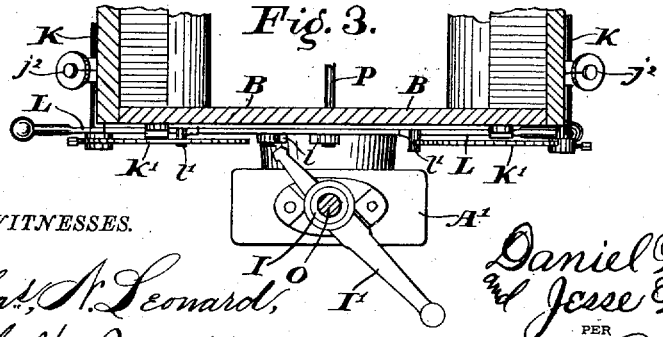
Figure 4:
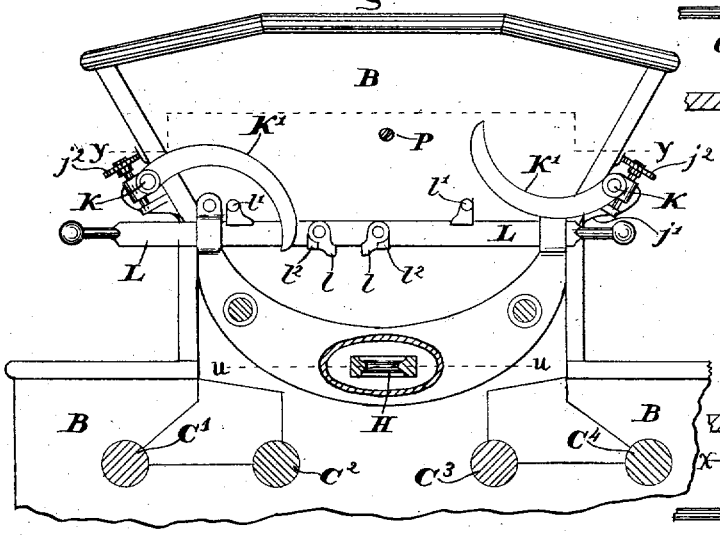
Figure 5:
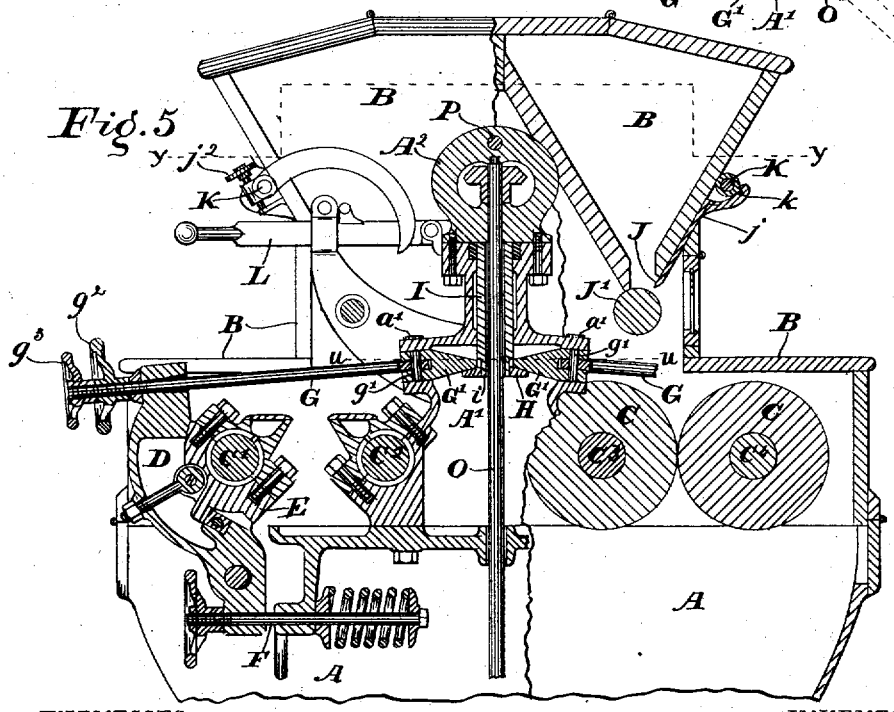

Referring to the accompanying drawings, which are made a part hereof, and on which similar letters of reference indicate similar parts, Figure 1 is a top or plan view of a mill embodying our invention; Fig. 2, an end elevation of the mill without the pulleys, as seen from the dotted line *z z* in Fig. 1; Fig. 3, a detail horizontal sectional view, looking downwardly from the dotted line *y y* in Figs. 2, 4, and 5, showing the mechanism involving our invention and the parts immediately connected thereto, the top casting, $A^2$, of the framework being removed; Fig. 4, a view of the end of the hopper and the mechanism thereon as seen from the dotted line *x x* in Figs. 1 and 6; Fig. 5, a transverse vertical sectional view of the principal portion of the mill, partly at the center and partly at one end, as is indicated by the dotted lines *w w* and *v v* in Fig. 1; and Fig. 6, a horizontal sectional view on the dotted line *u u* in Figs. 2, 4, and 5.

In said drawings, the portions marked A represent the supporting frame-work of the mill; B, the hopper and covering portions; C, the grinding-rolls; $C'$ $G^2$ $C^3$ $C^4$, the shafts thereto; D, swinging arms, in which one of each pair of rolls is mounted; E, adjustable boxes mounted on said arms; F, tempering rods or screws for adjusting the maximum force of the grinding-pressure; G, distance or adjusting rods for regulating the position of the arms; H, a bar passing through the machine and connecting the two pairs of said rods; I, a cam device for operating said bar; J, the feed-gates; K, the shaft for operating them; L, a bar for operating said shafts; M, a counter-shaft; N, adjustable devices wherein the boxes for said shaft are mounted; O, the rods whereby said devices are adjusted; P, the shaft whereby said rods are connected; and the numerals 1 to 16, inclusive, the several pulleys and belts by which the machine is driven.

The frame, hoppers, rolls, and much of the driving and operating mechanism will not be herein further described, as they form no part of the present invention.

The adjusting-rods G are for the purpose of moving the upper ends of the arms D back and forth, and thus bringing the individual rolls of the pairs nearer to or farther from each other. Each is preferably pivoted at its inner end to a bell-crank lever, $G'$, by a pivot, $g'$, and is provided at its outer end with a hand-nut, $g^2$, and a hand set-nut, $g^3$. The bell-crank levers are pivoted to the castings $A'$ by pivots $a'$, and their inner ends enter notches in the bar H, and are moved by said bar as it is moved back and forth. The arms D are adjusted inward or back by turning the hand-nuts $g^2$, and the rolls supported by said arms are thus positioned nearer to or farther from their fellows.

The bar H passes through from end to end of the machine, and connects all the bell-crank levers $G'$, so that they can be moved simultaneously. The forcing of this bar back and forth swings the bell-crank levers $G'$ on their pivots, and thus operates to throw the rods G and arms D inwardly and outwardly, thereby varying the distance between the individual rolls of the several pairs at one operation. The purpose of this is to move the rolls back from grinding relation, and then return them to exactly their former position without the delay and trouble incident to a readjustment of the machine.

Figure 6:
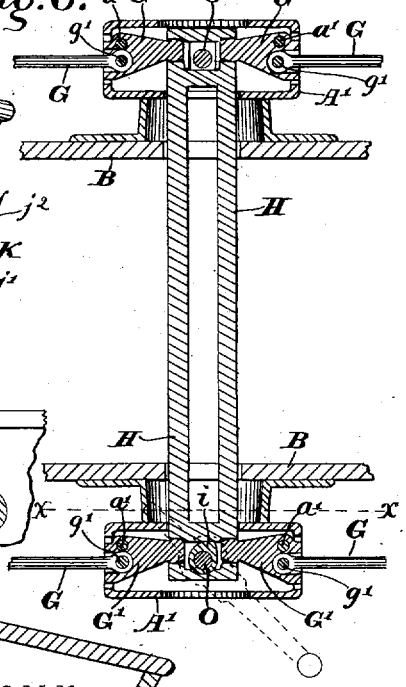

The device I is journaled vertically in bearings in the castings $A'$, and has a cam formation, *i*, upon its lower end, which enters into an orifice in the bar H, (see Figs. 5 and 6,)

and thus when turned forces said bar back and forth. It is provided with a crank or handle, I′, by which it is operated. As this handle moves back and forth, its inner end engages with the catches *l* on the bar L, and thus through said bar also operates the feed-gates.

The feed-gates J are thin blades, which run along near the feed-rolls J′, and each has upwardly-projecting arms *j* and *j′*. One of these arms, *j*, on each gate engages with a projection, *k*, on the corresponding shaft, K, (see Fig. 5,) and the gate is thus raised and lowered by the partial rotation of said shaft. The other arms, *j′*, are arranged to come in contact with stops $j^2$, and the gate is thus thereby prevented from opening too far. These stops are preferably in the form of thumb-screws, as shown, so that the distance to which the gates may open may be adjustably regulated.

The shafts K have upon them, preferably at or near their centers, projections, which engage with the arms *j* on the feed-gates, and are thus adapted to open said feed-gates or allow them to close, as said shafts are partially rotated in one or the other direction. These shafts have arms K′, the weight of which operates to rotate the shafts in one direction. Said shafts are rotated in the other direction by the bar L through the medium of the lugs *l′ l′* thereon, which lift the arms K′ as said bar is moved, so that lugs come in contact therewith.

The bar L is the medium by which the shafts K are rotated in one direction and the feed-gates thereby closed. When it is desired that the feed-gates shall be closed, the bar L is moved so that the projections *l′* shall come in contact with the arms K′, which raise the latter, thereby partially rotating the shafts K and causing the feed-gates to descend. When it is desired that the feed-gates shall be open, the bar L is moved in the reverse direction, and the weight of the arms K′ partially rotates the shafts K in the other direction and opens the gates. As hereinbefore stated, the handle I′ is extended so as to come in contact with the catches *l l* on this bar, whereby the feed-gates are opened or closed by the same movement that throws the grinding-rolls toward or from each other. In order that this operation shall not be prevented by the independent working of the bar L, the catches *l l* are pivoted so as to swing freely toward each other, whereby the end of said handle I′ can pass between said catches at any time without regard to their positions, and without moving said bar. In its movement from side to side the inner end of said handle comes in contact with one of said catches, lifts, and passes under it, when said catch will drop into the position shown most plainly by Fig. 4, and the handle cannot then be moved without moving the bar L, said catches being prevented from swinging outwardly by a small lug or projection, $l^2$, attached to the bar directly behind each of them. When said handle is swung around to the limit of its movement, as shown most plainly in Fig. 3, it is entirely free from the catches, and the bar can be moved back and forth entirely independently of said handle.

The various principal operations of our said invention may be recapitulated, as follows: The grain is fed through the hopper by means of the feed-gates J and feed-rolls J′ to the grinding-rolls, which reduce or grind it in the ordinary manner. When it is desired to temporarily part the rolls (thus stopping the grinding) and shut off the feed, it is done by moving the device I by means of the handle I′, which operates the bar H, which in turn, through the bell-crank levers G′, operates the rods G, and thus permits the arms D to move back and the rolls to part. The inner end of the handle I′ at the same time operates the rod L, which lifts the arms K′, thus partially rotating the shafts K and causing the gates J to close down against the feed-rolls J′ and shut off the flow of grain. A reversing of this motion brings all of said parts back into exactly their former position, and the grinding proceeds.

Having thus fully described our said invention, what we claim as new, and desire to secure by Letters Patent, is—

1. The combination of the arm-operating mechanism, the feed-gate-operating mechanism, and the device I, having a cam, *i*, to operate one mechanism, and a handle, I′, having a projecting end, to operate the other, whereby both mechanisms can be operated simultaneously, and the rolls thus thrown apart from each other and the feed-gates closed at one operation, substantially as set forth.

2. The combination of the feed-gate-operating mechanism, the bar L, provided with pivoted catches *l l*, and the handle I, said bar being adapted by means of said pivoted catches to be operated by the inwardly-projecting end of said handle, or to be operated without moving said handle, substantially as set forth.

3. The combination of the feed-gates, their operating-shafts, the arms K′ K′ on said shafts, the bar L, having lugs *l′ l′*, which operate said arms, and the pivoted catches *l l*, and the handle I′, whereby said bar can be operated by the inwardly-projecting end of said handle I′ or is permitted to be operated independently of said handle, substantially as set forth.

In witness whereof we have hereunto set our hands and seals, at Indianapolis, Indiana, this 20th day of January, A. D. 1883.

DANIEL W. MARMON. [L. S.]
JESSE WARRINGTON. [L. S.]

Witnesses:
CHAS. E. TEST,
WM. EBERT.